Figure 4:
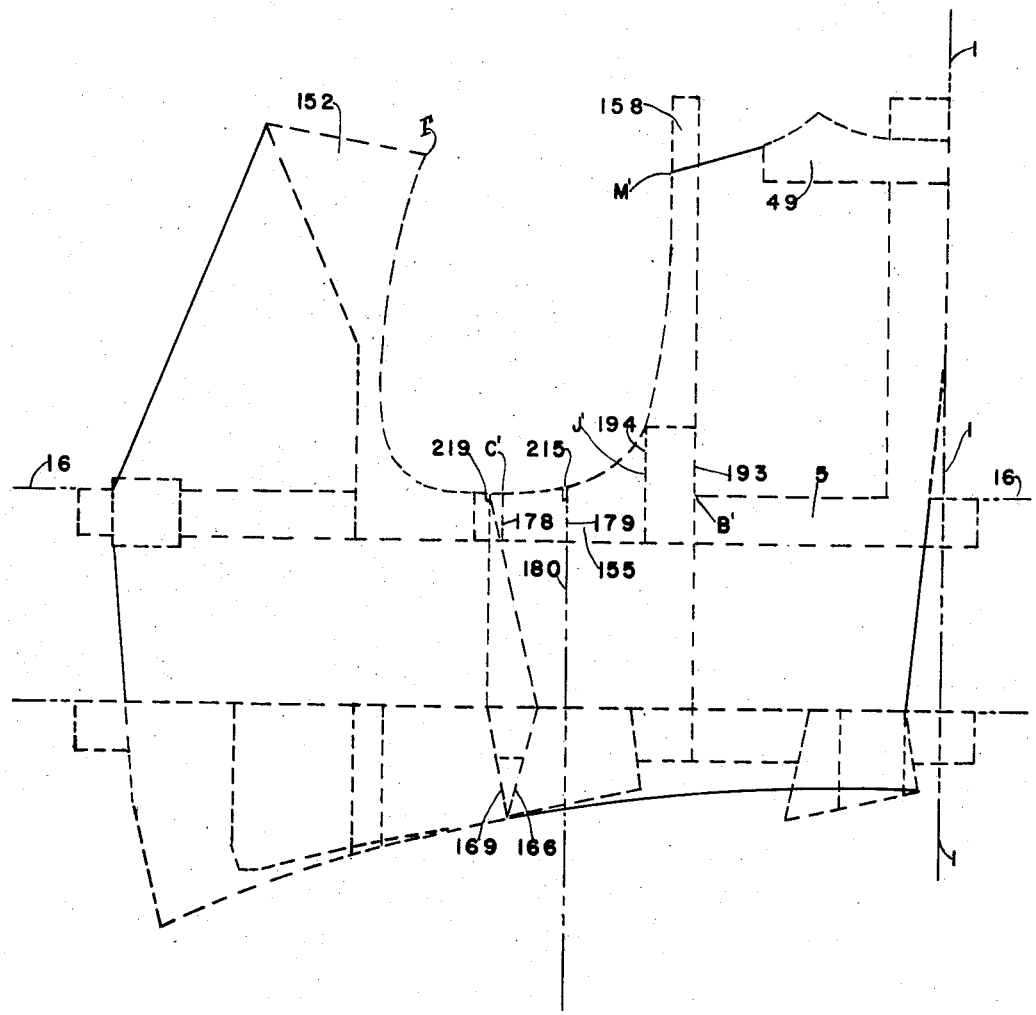

Oct. 14, 1958    A. T. KOLTHOFF ET AL    2,855,675
VEST BLADE ARMHOLE SLIDE
Original Filed July 17, 1951    2 Sheets-Sheet 1
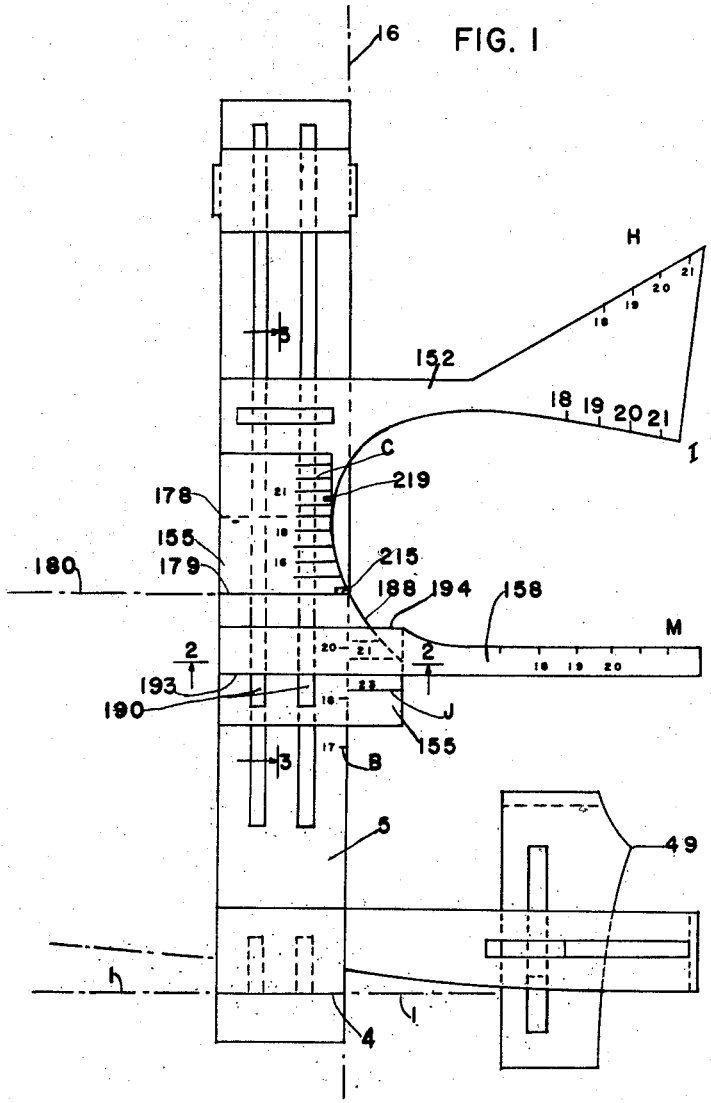
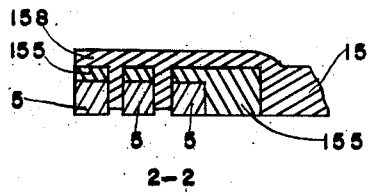
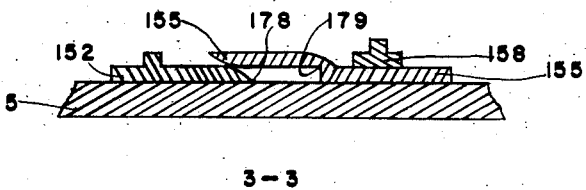
INVENTOR.
Aage Thorald Kolthoff
Hubert Louis Taylor Oct. 14, 1958 A. T. KOLTHOFF ET AL 2,855,675
VEST BLADE ARMHOLE SLIDE
Original Filed July 17, 1951 2 Sheets-Sheet 2

INVENTOR.
Aage Thorwald Kolthoff
Hubert Louis Taylor

United States Patent Office 2,855,675
Patented Oct. 14, 1958

2,855,675

VEST BLADE ARMHOLE SLIDE

Aage Thorvald Kolthoff and Hubert Louis Taylor,
New York, N. Y.

Original application July 17, 1951, Serial No. 237,249.
Divided and this application May 21, 1957, Serial No. 660,722

1 Claim. (Cl. 33—2)

This application is a division of the parent application of A. T. Kolthoff and H. L. Taylor, Serial Number 237,249, filed July 17, 1951, now Patent 2,826,815, for a Vest Drafting Slide Rule.

This invention relates to slide rules for use by tailors in drafting the breast part of a vest, but particularly to the drafting of the armhole region of the vest. The vest blade armhole slide herein claimed is to be used in the breast slide rule claimed in application No. 509,175, filed May 18, 1955, in conjunction with a modified front shoulder section and a modified back width slide of the above mentioned application by the applicants of this application. Also used with it for completing the draft of the vest is the vest waist slide rule claimed in application No. 237,249, filed July 17, 1951, by the same applicants.

The objects of this invention are to make possible a breast slide rule that can reproduce indefinitely the exact draft without resort to patterns, but by manipulating the vest blade armhole slide in conjunction with the rest of the breast slide rule to produce the outline of the vest along some of the edges of the vest blade armhole slide and along edges of other members of the breast slide rule.

Briefly the following figures represent:

Fig. 1 is a plan view of the breast slide rule showing the modified front shoulder section, the modified back width slide and the vest blade armhole slide. Fig. 2 is a transverse view showing the relative position of the vest blade armhole slide with respect to the back width slide and the basic rule. Fig. 3 is a transverse cross section view showing the relative position of the vest blade armhole slide with respect to the front shoulder member and the basic rule. Fig. 4 illustrates the drafting of a vest with the vest drafting slide rule.

Referring to Fig. 1, the breast slide rule is shown with its right edge 11 coinciding with the breast line 16, and its construction index line 4 coinciding with the draft construction line 1. The scales are matched for drafting a vest of size 38. To make the settings the back width slide 158 is first moved until its lower edge 193 matches mark 19 of scale B (the back width scale of the basic rule 5). Next the vest blade armhole slide 155 is moved until mark 19 of its scale J (the blade armhole scale having lines parallel to the short axis and located in the wider part of slide 155) matches the upper straight edge 194 of the back width slide 158. In this position the blade armhole slide 155 establishes the position of the midway line 179, the blade armhole notch 215 and the blade point notch 219. The blade armhole midway line 179 marked across the top of the vest blade armhole slide is prolonged on the draft to form the draft midway line 180. The blade armhole notch 215 is located at the intersection of the blade armhole slide curved edge 188 and its midway line 179. The blade point notch 219 of slide 155 is located along its curved edge at its upper extremity. Check marks are put at the two notches. Next the vest front shoulder section 152 is moved towards the vest blade armhole slide until its scale matching edge 178 matches mark 19 of scale C (the armhole proportion scale of slide 155 having lines parallel to the short axis and located in the narrower part of the member). With the back width slide 158, the vest blade armhole slide 155, and the vest front shoulder section 152 in these relative positions the size and shape of the armhole is established by tracing along the edges of these three slides.

The blade armhole slide 155 has two straight parallel edges parallel to its short axis, one long straight edge parallel to its long axis and opposite this edge a short straight edge parallel to its long axis and joined to an edge curving inwards in the same general direction of the long axis. The vest blade armhole slide 155 slides longitudinally with respect to the basic rule 5. It is transparent and all that part of it which is positioned over the basic rule 5 is undercut so that the basic rule 5 and part of the front shoulder section 152 can lie under it. Fig. 3 shows the front shoulder section 152 and the basic rule 5 lying under the vest blade armhole slide 155; and Fig. 2 further shows how the blade armhole slide 155 is undercut by showing the part of it that rests on the same surface as the basic rule 5 and the back width slide 158 while it also shows the undercut part positioned over the basic rule 5. A section of slide 155 extending beyond that part of it having its slots 190 is raised to a higher plane at its junction with the part having the slots 190. In line with this junction edge and marked on top of slide 155 is its midway line 179. Fig. 3 shows this junction edge marked as 179 since it and the line 179 are coincident and when seen from above though the transparent parts appear as one and the same. The slots 190 extend about half the length of member 155. The blade point notch 219 is located along the curved edge near the narrow end of slide 155. The blade armhole notch 215 is located along the curved edge where the midway line 179 meets the curved edge. The curved edge embodies the middle armhole shape line 188.

Referring to Fig. 4 which illustrates the drafting of a vest size 48 by the vest drafting slide rule; the slide rule is shown in position on the draft. The instrument is shown by the dash lines. The outline of the vest is made up of a solid line and the dash line of that part of the contour of the instrument that provides the remainder of the outline of the vest. The breast slide rule is in position along the draft breast line 16 and the draft construction line 1. Slide 49 has been moved to its required position, next slide 158 is moved along rule 5 until its lower edge 193 coincides with mark 24 of scale B at B′; then slide 155 is moved along rule 5 until mark 24 of its scale J coincides with the upper edge 194 of slide 158 at J′; then slide 152 is moved along rule 5 until its lower edge 178 coincides with mark 24 on scale C at C′. A check mark is made at 219 the blade point notch and at 215 the blade armhole notch. The midway line 179 is prolonged on the draft as the draft midway line 180. By tracing along the edge of the instrument between I′ and M′ the armhole is marked out. This completes that part of the design that is pertinent to the vest blade armhole slide 155 for which this specification is presented. From the waist line one extremity of edge 169 and 166 is projected to intersect or meet at the blade point notch 219.

Because those skilled in the art, after benefiting from this disclosure may be able to think up and produce modifications in the composition, configuration and disposition of the component elements that make up the invention as a whole, no limitation is intended by the phraseology of the foregoing specification or the illustrations in the drawings.

We claim:

In a vest drafting slide rule, a slidable transparent vest blade armhole slide member operating in a breast slide rule, adjustable longitudinally of a base rule and having two straight edges parallel to its short axis, a straight edge parallel to its long axis, another edge parallel to its long axis straight for some distance and thereafter curving inwards and in the same general direction as the long axis, said inward curving edge embodying the middle armhole shape line; all that part of said slide positioned over the base rule being undercut to permit other members to lie under it, two parallel slots parallel to its long axis located in the undercut region between the parallel edges parallel to the long axis and extending about half the length of the member for slidably engaging with other members, that part of the undercut region which extends beyond the slots for the rest of the length of the member being raised in a higher plane above that part having the slots for permitting another member to move under it, two scales along the curved edge, the divisions of said scales being short lines parallel to the short axis, one of said scales being in the narrower part of the member and being the armhole proportion scale for matching with the scale matching edge of the vest front shoulder member for measurements along the armhole, the other of said scales being in the wider part of the slide being the blade armhole scale for matching with the blade armhole scale matching edge of the vest back width slide for measurements along the blade of the armhole, a blade point notch cut in the curved edge near the narrow end of the blade armhole slide, a midway line normal to its long axis marked across the face and in line with the junction edge where the extending part of the slide raised to a higher plane joins the part having the slots, and a blade armhole notch cut in the curved edge where the midway line meets the curved edge.

<center>No references cited.</center>